United States Patent
Stewart et al.

(10) Patent No.: US 12,045,171 B2
(45) Date of Patent: Jul. 23, 2024

(54) METHOD AND SYSTEM OF COPYING DATA TO A CLIPBOARD

(71) Applicant: DATTO, INC., Norwalk, CT (US)

(72) Inventors: Timothy Michael Stewart, Poestenkill, NY (US); Hemant Sharma, East Greenbush, NY (US); Jason Michael Winkler, Schenectady, NY (US); Eric Compton Stolzenbach, Nassau, NY (US)

(73) Assignee: DATTO, INC., Norwalk, CT (US)

( * ) Notice: Subject to any disclaimer, the term of this patent is extended or adjusted under 35 U.S.C. 154(b) by 229 days.

(21) Appl. No.: 16/831,949

(22) Filed: Mar. 27, 2020

(65) Prior Publication Data
US 2021/0303473 A1 Sep. 30, 2021

(51) Int. Cl.
| G06F 12/0875 | (2016.01) |
| G06F 3/0482 | (2013.01) |
| G06F 9/54 | (2006.01) |
| H04N 1/00 | (2006.01) |
| G06F 3/048 | (2013.01) |

(52) U.S. Cl.
CPC ........ *G06F 12/0875* (2013.01); *G06F 3/0482* (2013.01); *G06F 9/541* (2013.01); *H04N 1/00408* (2013.01); *G06F 2212/608* (2013.01)

(58) Field of Classification Search
CPC .... G06F 12/0875; G06F 3/0482; G06F 9/541; G06F 2212/608; H04N 1/00408
See application file for complete search history.

(56) References Cited

U.S. PATENT DOCUMENTS

| 8,340,726 | B1 * | 12/2012 | Fujisaki | G06F 3/165 |
| | | | | 345/169 |
| 8,381,133 | B2 * | 2/2013 | Iwema | G06F 3/0488 |
| | | | | 715/845 |
| 8,817,053 | B2 * | 8/2014 | Robert | G06F 3/04842 |
| | | | | 715/764 |
| 10,180,714 | B1 * | 1/2019 | Kin | G06F 3/04883 |
| 10,521,278 | B2 * | 12/2019 | Anima | G06F 9/543 |
| 2005/0278647 | A1 * | 12/2005 | Leavitt | G06F 3/04817 |
| | | | | 715/779 |
| 2007/0176898 | A1 * | 8/2007 | Suh | H04M 1/72469 |
| | | | | 345/158 |

(Continued)

*Primary Examiner* — Nicholas Augustine
(74) *Attorney, Agent, or Firm* — MASCHOFF BRENNAN

(57) ABSTRACT

Disclosed is a method and system method for bulk copying data from a cell grid to a workspace memory, such as a clipboard. According to an exemplary embodiment of this disclosure, the method includes displaying, in a user interface, a plurality of cell rows and a plurality of cell columns arranged in a grid form, a user selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and displaying, in the user interface, a drop-down menu including a plurality of user selectable options, the user selectable options including a user selectable command to copy the plurality of selected rows and a common predetermined subset of the associated column entries to a workspace memory such as a clipboard.

16 Claims, 7 Drawing Sheets

(56) References Cited

U.S. PATENT DOCUMENTS

| | | | | |
|---|---|---|---|---|
| 2008/0036743 | A1* | 2/2008 | Westerman | G06F 3/038 |
| | | | | 345/173 |
| 2010/0229090 | A1* | 9/2010 | Newton | G06F 3/04883 |
| | | | | 715/764 |
| 2010/0306702 | A1* | 12/2010 | Warner | G06F 3/0482 |
| | | | | 715/834 |
| 2011/0154268 | A1* | 6/2011 | Trent, Jr. | G06F 3/017 |
| | | | | 715/863 |
| 2011/0164058 | A1* | 7/2011 | Lemay | G06F 3/04883 |
| | | | | 345/173 |
| 2012/0013540 | A1* | 1/2012 | Hogan | G06F 40/177 |
| | | | | 345/173 |
| 2013/0212541 | A1* | 8/2013 | Dolenc | G06F 3/0488 |
| | | | | 715/863 |
| 2017/0124048 | A1* | 5/2017 | Campbell | G06F 40/18 |
| 2019/0095255 | A1* | 3/2019 | Anima | G06F 40/186 |
| 2019/0222634 | A1* | 7/2019 | Jones | G06F 9/4856 |
| 2020/0184149 | A1* | 6/2020 | Honsowetz | G06F 3/04845 |

\* cited by examiner

| Ticket Number | Company | Contact | Title | Contract | Queue |
|---|---|---|---|---|---|
| T20141029.0014 | COMPANY A | NAME A | Test Ticket 1 | TOTAL IT | IT:Level I |
| T20140515.0002 | COMPANY B | NAME B | Change | IPP | Post Sale |
| T20130611.0003 | COMPANY C | NAME C | Executive printer not working | | Triage |
| T20140812.0001 | COMPANY D | NAME D | Software Support Request: | BLOCK HOUR CONTRACT | SW:Level I |
| T20140813.0001 | COMPANY E | NAME E | Software Support Request: | PER TICKET CONTRACT | SW:Level I |
| T20140218.0020 | COMPANY F | NAME F | Executive printer not working | | Triage |
| T20120604.0004 | COMPANY G | NAME G | Opportunity Closed:[Cloud Application] | | Post Sale |
| T20120530.0003 | COMPANY G | NAME G | Review security audit logs | HOSTED SaaS | SW:Level I |
| T20130806.0001 | COMPANY H | NAME H | Software Support Request: | HOSTED SaaS | SW:Level I |

FIG. 1

TICKET SEARCH — 102

| | Ticket Number | Company | Contract | Title | Contract | Queue |
|---|---|---|---|---|---|---|
| ☑ | T20141029.0014 | COMPANY A | NAME A | Test Ticket 1 | TOTAL IT | IT:Level I |
| ☑ | T20140515.0002 | COMPANY B | NAME B | Change | IPP | Post Sale |
| ☐ | T20130611.0003 | COMPANY C | NAME C | Executive printer not working | | Triage |
| ☑ | T20140812.0001 | COMPANY D | NAME D | Software Support Request: | BLOCK HOUR CONTRACT | SW:Level I |
| ☐ | T20140813.0001 | COMPANY E | NAME E | Software Support Request: | PER TICKET CONTRACT | SW:Level I |
| ☑ | T20140218.0020 | COMPANY F | NAME F | Executive printer not working | | Triage |
| ☐ | T20120604.0004 | COMPANY G | NAME G | Opportunity Closed-[Cloud Application] | | Post Sale |
| ☑ | T20120530.0003 | COMPANY G | NAME G | Review security audit logs | HOSTED SaaS | SW:Level I |
| ☐ | T20130806.0001 | COMPANY H | NAME H | Software Support Request: | HOSTED SaaS | SW:Level I |

FIG. 2

TICKET SEARCH

| ☐ | Ticket Number | Company | Contact | Title | Contract | Queue |
|---|---|---|---|---|---|---|
| | | | | Test Ticket 1 | | IT:Level 1 |
| | | | | Change | | Post Sale |
| | | | | Executive printer not working | | Triage |
| | | | | Software Support Request: | | SW:Level 1 |
| ☑ | T20140218.0020 | | | Software Support Request: | | SW:Level 1 |
| ☐ | T20120604.0004 | | | Executive printer not working | | Triage |
| ☑ | T20120530.0003 | | | Opportunity Closed:[Cloud Application] | | Post Sale |
| | | | | Review security audit logs | | SW:Level 1 |
| ☐ | T20130806.0001 | | | Software Support Request: | | SW:Level 1 |

Context menu (144):
- Accept Selected Tickets
- Forward/Modify Selected Tickets
- Add Note to Selected Tickets
- Add Selected Tickets to Service Call
- Copy Selected Tickets to Project
- Merge Selected Tickets into Another Ticket
- Add Selected Tickets to My Work List
- Disassociate Selected Tickets from Project
- Copy Selected Ticket Numbers/Titles to Clipb...
- Delete Selected Tickets

METHOD AND SYSTEM OF COPYING DATA TO A CLIPBOARD

BACKGROUND

The present exemplary embodiment relates to the selection and copying of cells of data from a data cell grid to a workspace, for example but not limited to, a clipboard. It finds particular application in conjunction with grids of data cells associated with a Business Management Platform, such as an IT (Information Technology) Professional Services Automation (PSA) web-based interface system for receiving and processing ticket service requests and will be described with particular reference thereto. However, it is to be appreciated that the present exemplary embodiment is also amenable to other like applications.

BRIEF DESCRIPTION

In one embodiment of this disclosure, described is a processor implemented method for bulk copying data from a cell grid to a workspace memory, the method comprising: a) displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings; b) a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and c) displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file, an API (Application Programming Interface) and a program file.

In another embodiment of this disclosure, described is an application user interface operatively associated with a computer device for bulk copying data from a cell grid to a workspace memory, the application user interface configured to perform a method comprising: a) displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings; b) a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and c) displaying in the user interface a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file, an API (Application Programming Interface) and a program file.

In another embodiment of this disclosure, described is a processor implemented method for bulk copying data from a cell grid to a clipboard, the method comprising: a) displaying, in a user interface, a plurality of service ticket entries in the cell grid, the cell grid including a plurality of cell rows and plurality of cell columns arranged in a grid form, the first row of cells including a plurality of cell column headings and each other row of cells associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number; b) a user, via the user interface, selecting a plurality of rows of service ticket entries by selecting a respective selector indicator of all rows of service ticket entries to be copied, the selected plurality of rows including a subset of a total number of rows displayed and a noncontinuous group of sequential rows where at least one nonselected row is located and displayed between two selected rows; and c) displaying, in the user interface, a drop-down menu including a plurality of user selectable options, the user selectable options including a user selectable command to copy the plurality of selected ticket numbers and a common predetermined subset of the associated column entries to a clipboard associated with a neutral storage space, the clipboard configured to enable the user to copy the plurality of selected ticket numbers and predetermined subset of the associated column entries into one or more of an application, an API (Application Programming Interface), a user file and a program file.

In a another embodiment of this disclosure, described is a PSA (Professional Services Automation module) operatively associated with a computer device for bulk copying data from a cell grid to a clipboard, the PSA configured to perform a method comprising: a) displaying, in a user interface, a plurality of service ticket entries in the cell grid, the cell grid including a plurality of cell rows and plurality of cell columns arranged in a grid form, the first row of cells including a plurality of cell column headings and each other row associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number; b) a user, via the user interface, selecting a plurality of rows of service ticket entries by selecting a respective selector indicator of all rows of service ticket entries to be copied, the selected plurality of rows including a subset of a total number of rows displayed and a noncontinuous group of rows where at least one nonselected row is located and displayed between two selected rows; and c) displaying, in the user interface, a drop-down menu including a plurality of user selectable options, the user selectable options including a user selectable command to copy the plurality of selected ticket numbers and a common predetermined subset of the associated column entries to a clipboard associated with a neutral storage space, the clipboard configured to enable the user to copy the plurality of selected ticket numbers and predetermined subset of the associated column entries into one or more of an application, an API (Application Programming Interface), a user file and a program file.

In yet another embodiment of this disclosure, described is a processor implemented method for bulk copying data from a cell grid to a workspace memory, the method comprising: a) displaying, in a user interface, a plurality of cell rows and a plurality of cell columns arranged in a grid form, the first row of cells including a plurality of cell column headings and each other row of cells including an ordered group of cells associated with the plurality of cell column headings, and each column of cells including a column selector indicator; b) a user, via the user interface, selecting a plurality of columns of cell entries by selecting a respective column selector indicator of all columns to be copied, the selected plurality of columns including a subset of a total number of columns displayed and a noncontinuous group of sequential columns where at least one nonselected column is located and displayed between two selected columns; and c) displaying, in the user interface, a drop-down menu including a plurality of user selectable options, the user selectable options including a user selectable command to copy the plurality of selected columns and a common predetermined subset of the associated row entries to a workspace memory, the workspace memory configured to enable the user to copy the plurality of selected columns and predetermined subset of the associated row entries into one or more of an application, a user file, an API (Application Programming Interface) and a program file.

In a further embodiment of this disclosure, described is an application user interface operatively associated with a computer device for bulk copying data from a cell grid to a workspace memory, the application user interface configured to perform a method comprising: a) displaying, in a user interface, a plurality of cell rows and a plurality of cell columns arranged in a grid form, the first row of cells including a plurality of cell column headings and each other row of cells including an ordered group of cells associated with the plurality of cell column headings, and each column of cells including a column selector indicator; b) a user, via the user interface, selecting a plurality of columns of cell entries by selecting a respective column selector indicator of all columns to be copied, the selected plurality of columns including a subset of a total number of columns displayed and a noncontinuous group of sequential columns where at least one nonselected column is located and displayed between two selected columns; and c) displaying, in the user interface, a drop-down menu including a plurality of user selectable options, the user selectable options including a user selectable command to copy the plurality of selected columns and a common predetermined subset of the associated row entries to a workspace memory, the workspace memory configured to enable the user to copy the plurality of selected columns and predetermined subset of the associated row entries into one or more of an application, a user file, an API (Application Programming Interface) and a program file.

BRIEF DESCRIPTION OF THE DRAWINGS

FIG. 1 illustrates is a user interface associated with a cell grid populated with a plurality of ticket service entries associated with a web-browser-based PSA according to an exemplary embodiment of this disclosure;

FIG. 2 illustrates the user interface shown in FIG. 1, also including a plurality of user selected rows of cells/plurality of ticket service entries associated with the web browser-based PSA according to an exemplary embodiment of this disclosure;

FIG. 3 illustrates the user interface shown in FIGS. 1 and 2, also including a drop-down menu to Copy Selected Ticket Numbers/Titles to a Clip Board associated with the web-browser-based PSA according to an exemplary embodiment of this disclosure;

FIG. 5 is another illustration of a user interface including a Ticket Search window and associated cell grid populated with a plurality of ticket service entries associated with a web-browser-based PSA according to an exemplary embodiment of this disclosure;

FIG. 6 is another illustration of the user interface shown in FIG. 5, including a drop-down user file directory window including a plurality of user files, where the Notes File highlighted includes a user file including the results of the command to Copy Selected Ticket Numbers/Titles to a Clip Board according to an exemplary embodiment of this disclosure.

DETAILED DESCRIPTION

Figure 4:
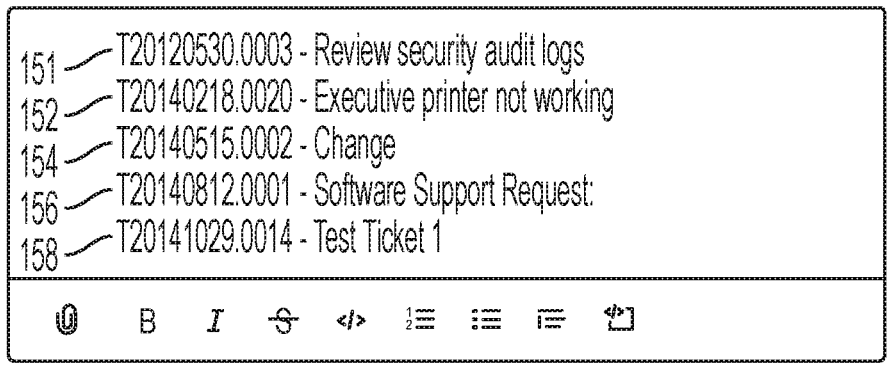
FIG. 4 shows the clipboard contents associated with the user interface shown in FIGS. 1-3 after the execution of a drop-down menu command to Copy Selected Ticket Numbers/Titles to a Clip Board associated with the web-browser-based PSA according to an exemplary embodiment of this disclosure.

PSA (Professional Services Automation) users, and users of spreadsheet user programs, often copy information to their clipboard and paste it into emails, chat messages, documents, etc. Doing this for multiple rows in a grid of search results is extremely time consuming, cumbersome and prone to error, and increasingly so when the needs exists to copy data from many rows. For example, when a user is required to individually copy/paste each cell of data from the search grid into an email, chat message, document, etc.

The disclosed method and system provides an ability for a user to check a checkbox associated with the rows of cell data desired to be copied, and the ability to execute a bulk "copy to clipboard" action which strategically copies key identifying data, i.e. cells, from the selected rows and copies that data to the user's clipboard in one single action. Importantly, the selected data is not required to be located in adjacent columns or rows.

After the execution of the bulk "copy to clipboard", the user can paste the contents of the clipboard, including the selected rows and associated key identifying data from the associated grid columns into an email, chat message, document, API (Application Programming Interface) other program or user file, etc.

While this disclosure and exemplary embodiments described herein relate to a PSA/IT (Information Technology) Business Management Platform, it is to be understood that the described bulk "copy to clipboard" technology described is applicable to any cell grid type user interface, such as but not limited to a data table, a spreadsheet, a data form, a data template, etc., where a user desires to bulk copy data cells to a user workspace or active/static memory location, such as but not limited to, a clipboard, neutral work space, chat message, document, archival file, API (Application Programming Interface), program, other user interface, etc. Furthermore, it is to be understood the exemplary methods and systems described herein generally relate to a bulk list building method and system that bulk copies data from a cell grid to a workspace memory arranged in a predetermined, i.e. user configured or coded, templated format. In other words, the bulk list generated or built includes a transformation of the copied data into a templated list of the data cells associated with the user selected rows/columns as will be further described herein.

According to an exemplary embodiment, disclosed is a processor implemented method and system for bulk copying data from a cell grid to a workspace memory, the method including: displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings; a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file, an API (Application Programming Interface) and a program file.

With reference to FIG. 1 illustrated is a user interface associated with a cell grid populated with a plurality of ticket service entries associated with a web-browser-based PSA according to an exemplary embodiment of this disclosure. As shown, the "Copy to Clipboard" function is available from a context grid (and drill-in grids) of a Ticket, Task, Opportunity, and Configuration Item.

The user interface includes a Ticket Search window 102; Search Filters button 104; Add New Ticket button 106; Export button 108; Ticket Search Window Row 1 111; Ticket Search Window Row 2 112; Ticket Search Window Row 3 113; Ticket Search Window Row 4 114; Ticket Search Window Row 5 115; Ticket Search Window Row 6 116; Ticket Search Window Row 7 117; Ticket Search Window Row 8 118; Ticket Search Window Row 9 119; Ticket Search Window Column 1 121; Ticket Search Window Column 2 122; Ticket Search Window Column 3 123; Ticket Search Window Column 4 124; Ticket Search Window Column 5 125; Ticket Search Window Column 6 126; Ticket Search Window Column 7 127; Ticket Search Window Row 1 Checkbox 131; Ticket Search Window Row 2 Checkbox 132; Ticket Search Window Row 3 Checkbox 133; Ticket Search Window Row 4 Checkbox 134; Ticket Search Window Row 5 Checkbox 135; Ticket Search Window Row 6 Checkbox 136; Ticket Search Window Row 7 Checkbox 137; Ticket Search Window Row 8 Checkbox 138; and Ticket Search Window Row 9 Checkbox 139.

As shown, the user interface/display includes a plurality of service ticket rows of cells:

Ticket Search Window Row 1 111 includes an associated ticket number T20141029.0014 in Ticket Search Window Column 2 122 which has a column heading of "Ticket Number"; an associated company "Company A" in Ticket Search Window Column 3 123 which has a heading of "Company"; an associated contact "Name A" in Ticket Search Window Column 4 124 which has a heading of "Contact"; an associated ticket title "Test Ticket 1" in Ticket Search Window Column 5 125 which has a heading of "Title"; an associated contract name "Total IT" in Ticket Search Window column 6 126 which has a column heading of "Contract"; and an associated queue of "IT:Level 1" in Ticket Search Window Column 7 127 which has a column heading of "Queue";

Ticket Search Window Row 2 112 includes an associated ticket number T20140515.0002 in Ticket Search Window Column 2 122 which has a column heading of "Ticket Number"; an associated company "Company B" in Ticket Search Window Column 3 123 which has a heading of "Company"; an associated contact "Name B" in Ticket Search Window Column 4 124 which has a heading of "Contact"; an associated ticket title "Change" in Ticket Search Window Column 5 125 which has a heading of "Title"; an associated contract name "IPP" in Ticket Search Window column 6 126 which has a column heading of "Contract"; and an associated queue of "Post Sale" in Ticket Search Window Column 7 127 which has a column heading of "Queue";

Ticket Search Window Row 3 113 includes an associated ticket number T20130611.0003 in Ticket Search Window Column 2 122 which has a column heading of "Ticket Number"; an associated company "Company C" in Ticket Search Window Column 3 123 which has a heading of "Company"; an associated contact "Name C" in Ticket Search Window Column 4 124 which has a heading of "Contact"; an associated ticket title "Executive printer not working" in Ticket Search Window Column 5 125 which has a heading of "Title"; no associated contract name in Ticket Search Window column 6 126 which has a column heading of "Contract"; and an associated queue of "Triage" in Ticket Search Window Column 7 127 which has a column heading of "Queue";

Ticket Search Window Row 4 114 includes an associated ticket number T20140812.0001 in Ticket Search Window Column 2 122 which has a column heading of "Ticket Number"; an associated company "Company D" in Ticket Search Window Column 3 123 which has a heading of "Company"; an associated contact "Name D" in Ticket Search Window Column 4 124 which has a heading of "Contact"; an associated ticket title "Software Support Request:" in Ticket Search Window Column 5 125 which has a heading of "Title"; an associated contract name "Block Hour Contract" in Ticket Search Window column 6 126 which has a column heading of "Contract"; and an associated queue of "SW:Level 1" in Ticket Search Window Column 7 127 which has a column heading of "Queue";

Ticket Search Window Row 5 115 includes an associated ticket number T20140813.0001 in Ticket Search Window Column 2 122 which has a column heading of "Ticket Number"; an associated company "Company E" in Ticket Search Window Column 3 123 which has a heading of "Company"; an associated contact "Name F" in Ticket Search Window Column 4 124 which has a heading of "Contact"; an associated ticket title "Software Support Request:" in Ticket Search Window Column 5 125 which has a heading of "Title"; an associated contract name "Per Ticket Contract" in Ticket Search Window column 6 126 which has a column heading of "Contract"; and an associated queue of "SWLevel 1" in Ticket Search Window Column 7 127 which has a column heading of "Queue";

Ticket Search Window Row 6 116 includes an associated ticket number T20140218.0020 in Ticket Search Window Column 2 122 which has a column heading of "Ticket Number"; an associated company "Company F" in Ticket Search Window Column 3 123 which has a heading of "Company"; an associated contact "Name F" in Ticket Search Window Column 4 124 which has a heading of "Contact"; an associated ticket title "Executive printer not working" in Ticket Search Window Column 5 125 which has a heading of "Title"; no associated contract name in Ticket Search Window column 6 126 which has a column heading of "Contract"; and an associated queue of "Triage" in Ticket Search Window Column 7 127 which has a column heading of "Queue";

Ticket Search Window Row 7 117 includes an associated ticket number T20120604.0004 in Ticket Search Window Column 2 122 which has a column heading of "Ticket Number"; an associated company "Company G" in Ticket Search Window Column 3 123 which has a heading of "Company"; an associated contact "Name G" in Ticket Search Window Column 4 124 which has a heading of "Contact"; an associated ticket title "Opportunity Closed:[Cloud Application]" in Ticket Search Window Column 5 125 which has a heading of "Title"; no associated contract name in Ticket Search Window column 6 126 which has a column heading of "Contract"; and an associated queue of "Post Sale" in Ticket Search Window Column 7 127 which has a column heading of "Queue";

Ticket Search Window Row 8 118 includes an associated ticket number T20120530.0003 in Ticket Search Window Column 2 122 which has a column heading of "Ticket Number"; an associated company "Company G" in Ticket Search Window Column 3 123 which has a heading of "Company"; an associated contact "Name G" in Ticket Search Window Column 4 124 which has a heading of "Contact"; an associated ticket title "Review security audit logs" in Ticket Search Window Column 5 125 which has a heading of "Title"; an associated contract name "Hosted SaaS" in Ticket Search Window column 6 126 which has a column heading of "Contract"; and an associated queue of "SW:Level 1" in Ticket Search Window Column 7 127 which has a column heading of "Queue"; and Ticket Search Window Row 9 119 includes an associated ticket number T20130806.0001 in Ticket Search Window Column 2 122 which has a column heading of "Ticket Number"; an associated company "Company H" in Ticket Search Window Column 3 123 which has a heading of "Company"; an associated contact "Name H" in Ticket Search Window Column 4 124 which has a heading of "Contact"; an associated ticket title "Software Support Request:" in Ticket Search Window Column 5 125 which has a heading of "Title"; an associated contract name "Hosted SaaS" in Ticket Search Window column 6 126 which has a column heading of "Contract"; and an associated queue of "SWLevel 1" in Ticket Search Window Column 7 127 which has a column heading of "Queue".

With reference to FIG. 2, illustrated is the user interface shown in FIG. 1, also including a plurality of user selected rows of cells/plurality of ticket service entries 131, 132, 134, 136 and 138 associated with the web-browser-based PSA according to an exemplary embodiment of this disclosure.

To perform a bulk copy of cells associated with a predetermined/templated/user selected group of columns associated with a selected a group of rows/tickets, for example Ticket Rows 111, 112, 114, 116 and 118, the user checks the corresponding Ticket Search Window Row 1 Checkbox 131; Ticket Search Window Row 2 Checkbox 132; Ticket Search Window Row 4 Checkbox 134; Ticket Search Window Row 6 Checkbox 136; and Ticket Search Window Row 8 Checkbox 138.

With reference to FIG. 3, illustrated is the user interface shown in FIGS. 1 and 2, also including a drop-down menu 142 to Copy Selected Ticket Numbers/Titles 144 to a Clip Board associated with the web-browser-based PSA according to an exemplary embodiment of this disclosure, providing an option to copy all of the selected items to the clipboard. The predetermined/templated/user selected column cell data copied can be varied, depending on the user's requirements. For example, the disclosed PSA web-browser application copies the following data to the clipboard:

Tickets: ticket number•ticket title;

Tasks: task number-task title; and

Configuration Items: configuration item ID-product name.

With reference to FIG. 4, shown is the clipboard contents associated with the user interface shown in FIGS. 1-3 after the execution of a drop-down menu command to Copy Selected Ticket Numbers/Titles to a Clip Board associated with the web-browser-based PSA according to an exemplary embodiment of this disclosure. The clipboard contents including Selected Ticket Number and associated Title column entry 151; Selected Ticket Number and associated column Title entry 152; Selected Ticket Number and associated column Title entry 154; Selected Ticket Number and associated column Title entry 156; and Selected Ticket Number and associated column Title entry 158.

The disclosed method and system for performing a bulk copy provides significant time savings to copy and paste multiple Items into an email or message. According to an exemplary embodiment, the list is pasted with a line break after each one, making it easy to read and requiring no additional formatting. In summary, the disclosed PSA exemplary embodiment includes the following steps:

1) A user accesses a web-based PSA which displays a grid of ticket data. The user wants to send an email, Slack, etc. asking a team to review certain tickets. Note that the "Ticket Number" and "Title" columns are not adjacent to one another;

2) The user selects the checkboxes that correspond to the tickets to be reviewed by the team. Note that the selected tickets include tickets not adjacent to one another;

3) Using the bulk menu at the top of the checkbox column, the user chooses the "Copy Selected Ticket Numbers/Titles to Clipboard" option. The "[Ticket Number]-[Ticket Title]" string (for each selected ticket) is copied to the user's clipboard;

Note: This "[Ticket Number]-[Ticket Title]" syntax can be hard-coded, or users can define the syntax, such as, using a combination of dynamic variables and alphanumeric characters. For example: "[Ticket Number] ([Company]) | Assigned to: [Primary Resource]" would be rendered as: "T20190819.2123 (ACME Corporation) | Assigned to: John Doe"; and 4) Using a CTRL command, the block of text is pasted into an email or SLACK message to the team.

This functionality can be included as part of a reusable grid framework, such as PSA, or added to any data grid, by defining the syntax of the string that gets copied to the clipboard.

The code snippet below provides one example of an exemplary embodiment of a computer/processor implemented method for bulk copying data from a cell grid to a workspace, e.g. clipboard.

Copy to Clipboard Snippets

```
Get the ticket IDs for the Selected rows to be used in the bulk menu
public
AjaxActionResult BulkContextMenu(IList<string> keyFieldValues)
{
  // get ticket
  using (CustomerRetrievalContext  retrievalContext  =  new CustomerRetrievalContext( ))
  {
    IList<int> ticketIds = keyFieldValues.Select(o => int. Parse(o)).ToList( );
    // find the ticket
    AutotaskTicket.AutotaskTicketManager  ticketManager  =  new AutotaskTicket.AutotaskTicketManager(retrievalContext);
    IList<AutotaskTicket> tickets = ticketManager.FindByIds(ticketIds);
    // Map to the model.
    BulkContextMenuModel  model  =  new BulkContextMenuModel(keyFieldValues, tickets);
    BulkMenu menu = new BulkMenu(model);
    return this.Ajax.ViewConfiguration.ContextMenu(menu);
  }
}
Add Copy Command to the menu with the data
if (canShowCopyButton)
{
    CopyTextMenuButton copy  ToClipboardButton  =  new CopyTextMenuButton(BulkMenuResource.CopyToClipboard, this._model.TicketNumberAndTitles);
    generalButtons.AppendChild (copyToClipboardButton);
}
Get the data loaded for the selected Rows
public BulkContextMenuModel(
    IList<string> keyFieldValues,
    IList<AutotaskTicket> tickets)
{
    this.HasSelection = keyFieldValues != null && keyFieldValues.Count > 0;
    this.CanShowCopyButton = keyFieldValues.Count <= 100;
    this.TicketNumberAndTitles = new List<string>( );
    foreach (AutotaskTicket ticket in tickets)
    {
        this.TicketNumberAndTitles.Add(string.Format(CultureInfo.CurrentCulture,
"{0} - {1}", ticket. TicketNumber, ticket.Title));
    }
}
namespace AutotaskButtons
{
  /**
   * Represents a menu button that copies text to the system clipboard.
   */
  export class CopyTextMenuButton extends Autotask.Lifecycle Object
  {
     private readonly _text: string | null;
     private _clipboardManager: Autotask.ClipboardManagement | null;
     public constructor(id: string, isEnabled: boolean, text: string | null)
     {
       super(id);
       this._text = text;
       this._clipboardManager = null;
       if (isEnabled)
       {
         const  butonElement:  HTMLElement  = AutotaskDomSystem.Document.getElementById(id);
         buton Element.addEventListener("click", ( ) => { this._clickListener( ); });
       }
     }
```

```
        // Private Properties
        private get clipboardManager( ): Autotask.ClipboardManagement
        {
            if (this._clipboardManager = = = null)
            {
                this._clipboardManager = new Autotask.ClipboardManagement( );
            }
            return this._clipboardManager;
        }
        private _clickListener( ): void
        {
            if (this._text != = null)
            {
                this.clipboardManager.copyText(this._text);
                window.autotask.contextOverlayManagement._hideVisibleContextOverlays( );
            }
            else
            {
ClipboardManagement.ts:
namespace Autotask
{
    /**
     * Manages clipboard operations.
     */
    export class ClipboardManagement
    {
        private _copyResult: boolean;
        public constructor( )
        {
            this._copyResult = false;
        }
        // Public Methods
        public copyText(text: string): boolean
        {
            const element: HTMLElement = this._createElement(text);
            document.body.appendChild (element);
            this._copy(element);
            document.body.removeChild(element);
            return this._copyResult;
        }
        // Private Methods
        private _copy(element: HTMLElement): void
        {
            this._copyResult = false;
            const range: Range = document.createRange( );
            range.selectNodeContents(element);
            const selection: Selection | null = window.getSelection( );
            if (selection != = null)
            {
                selection.removeAllRanges( );
                selection.addRange(range);
                document.execCommand("fontSize", false, "3");
                document.execCommand("copy");
                selection.removeAllRanges( );
            }
        }
        private _createElement(text: string): HTMLElement
        {
            const element: HTMLElement = document.createElement("div");
            element.style.backgroundColor = "#fff";
            element.style.color = "#000";
            element.style.left = "-1000px";
            element.style.position = "fixed";
            element.style.top = "-1000px";
            element.style.width = "10px";
            element.style.whiteSpace = "pre-wrap";
            element.textContent = text;
            element.addEventListener("copy", ( ) => { this._onCopy( ); });
            return element;
        }
        private _onCopy( ): void
        {
            this._copyResult = true;
        }
    }
}
```

-continued

```
CopyTextMenuButton.cs (server code):
using System;
using System. Collections.Generic;
using System.Linq;
using Autotask.Web. Exceptions;
using Autotask.Web.Html.Elements.Normal;
using Autotask.Web.Identifiers;
using Autotask.Web.JavaScript;
using Autotask.Web.JavaScript.Parameters;
using Autotask.Web.ResponseGeneration;
using AutotaskMvc.Framework.JavaScript.Parameters;
namespace AutotaskMvc.Framework.ViewConfigurationSupport.Buttons
{
        /// <summary>
        /// A menu button copies text to the system clipboard.
        /// </summary>
        public class Copy TextMenuButton : IContextMenuButton
        {
          private readonly string _copyText;
          private readonly bool _isEnabled;
          private readonly string _menuText;
          /// <summary>
          /// Initializes a new instance of the <see cref="CopyTextMenuButton"/>
class.
          /// </summary>
          /// <remarks>Using this constructor will result this button being
disabled.< /remarks>
          /// <param name="menuText">The menu text.< /param>
          public CopyTextMenuButton(string menuText)
          {
            if (string.IsNullOrWhiteSpace(menuText))
            {
              throw                                                            new
ArgumentException(Messages.IsNullOrWhiteSpace, nameof(menuText));
            }
            this._menuText = menu Text;
            this._isEnabled = false;
          }
          /// <summary>
          /// Initializes a new instance of the <see cref="CopyTextMenuButton"/>
class.
          /// </summary>
          /// <param name="menuText">The menu text.< /param>
          /// <param name="copyText">The copy text.< /param>
          public Copy TextMenuButton(string menuText, string copyText)
          {
            if (string.IsNullOrWhiteSpace(menuText))
            {
              throw                                                            new
ArgumentException(Messages.IsNullOrWhiteSpace, nameof(menuText));
            }
            if (string.IsNullOrWhiteSpace(copyText))
            {
              throw                                                            new
ArgumentException(Messages.IsNullOrWhiteSpace, nameof(copyText));
            }
            this._menuText = menu Text;
            this._copyText = copyText;
            this._isEnabled = true;
          }
          /// <summary>
          /// Initializes a new instance of the <see cref="CopyTextMenuButton"/>
class.
          /// </summary>
          /// <param name="menuText">The menu text.< /param>
          /// <param name="copyTextList">The list of text to be copied to the
clipboard.< /param>
          /// <remarks>Each string in the list will be a separate line when copied to
the clipboard.< /remarks>
          public Copy TextMenuButton(string menuText, IList<string> copyTextList)
          {
            if (string.IsNullOrWhiteSpace(menuText))
            {
              throw                                                            new
ArgumentException(Messages.IsNullOrWhiteSpace, nameof(menuText));
            }
```

```
        if (copyTextList = = null)
        {
            throw new ArgumentNullException(nameof(copyTextList));
        }
        if (!copyTextList.Any( ))
        {
            throw new ArgumentException("The list of text to copy must
contain at least one item.", nameof(copyTextList));
        }
        if (copyTextList.Any(o => string.IsNullOrWhiteSpace(o)))
        {
            throw new ArgumentException("The list of text to copy
contains an item that is null, empty or contains only whitespace.", nameof(copyTextList));
        }
        this._menuText = menuText;
        this._copyText = string.Join("\r\n", copyTextList);
        this._isEnabled = true;
    }
    /// <summary>
    /// Gets a value indicating whether this instance has an icon.
    /// </summary>
    public bool HasIcon
    {
        get
        {
            return false;
        }
    }
    /// <summary>
    /// Gets or sets the tooltip.
    /// </summary>
    public string Tooltip { get; set; }
    /// <summary>
    /// Renders this instance.
    /// </summary>
    /// <param name="context">The render context.</param>
    public void Render(IRenderContext context)
    {
        Span iconSpan = new Span( );
        iconSpan.AddCssClass("Icon");
        Span textSpan = new Span( );
        textSpan.AddCssClass("Text");
        textSpan.AppendChild (this._menuText);
        Identifier id = new Identifier( );
        Anchor anchor = new Anchor( );
        anchor.Id = id.Value;
        if (!string.IsNullOrWhiteSpace(this.Tooltip))
        {
            anchor.Title = this.Tooltip;
        }
        anchor.AddCssClass("CopyTextMenuButton");
        anchor.AddCssClass("Button");
        anchor.AddCssClass("ButtonIcon");
        if (!this._isEnabled)
        {
            anchor.AddCssClass("DisabledState");
        }
        else
        {
            anchor.AddCssClass("NormalState");
        }
        anchor.AppendChild(iconSpan);
        anchor.AppendChild(textSpan);
        anchor.Render(context);
        context.AddConstructorCall(this.CreateConstructorCall(id));
    }
    /// <summary>
    /// Creates the constructor call.
    /// </summary>
    /// <param name="buttonId">The id of the button.</param>
    /// <returns>A ConstructorCall.</returns>
    private ConstructorCall CreateConstructorCall(Identifier buttonId)
```

```
        {
            ConstructorCall    call    =    new
ConstructorCall("AutotaskButtons.CopyTextMenuButton");
            call.Parameters.Add(new IdentifierParameter(buttonId));
            call.Parameters.Add(new BooleanParameter(this._isEnabled));
            call.Parameters.Add(new StringParameter(this._copyText));
            return call;
        }
    }
}
```

Figure 5:
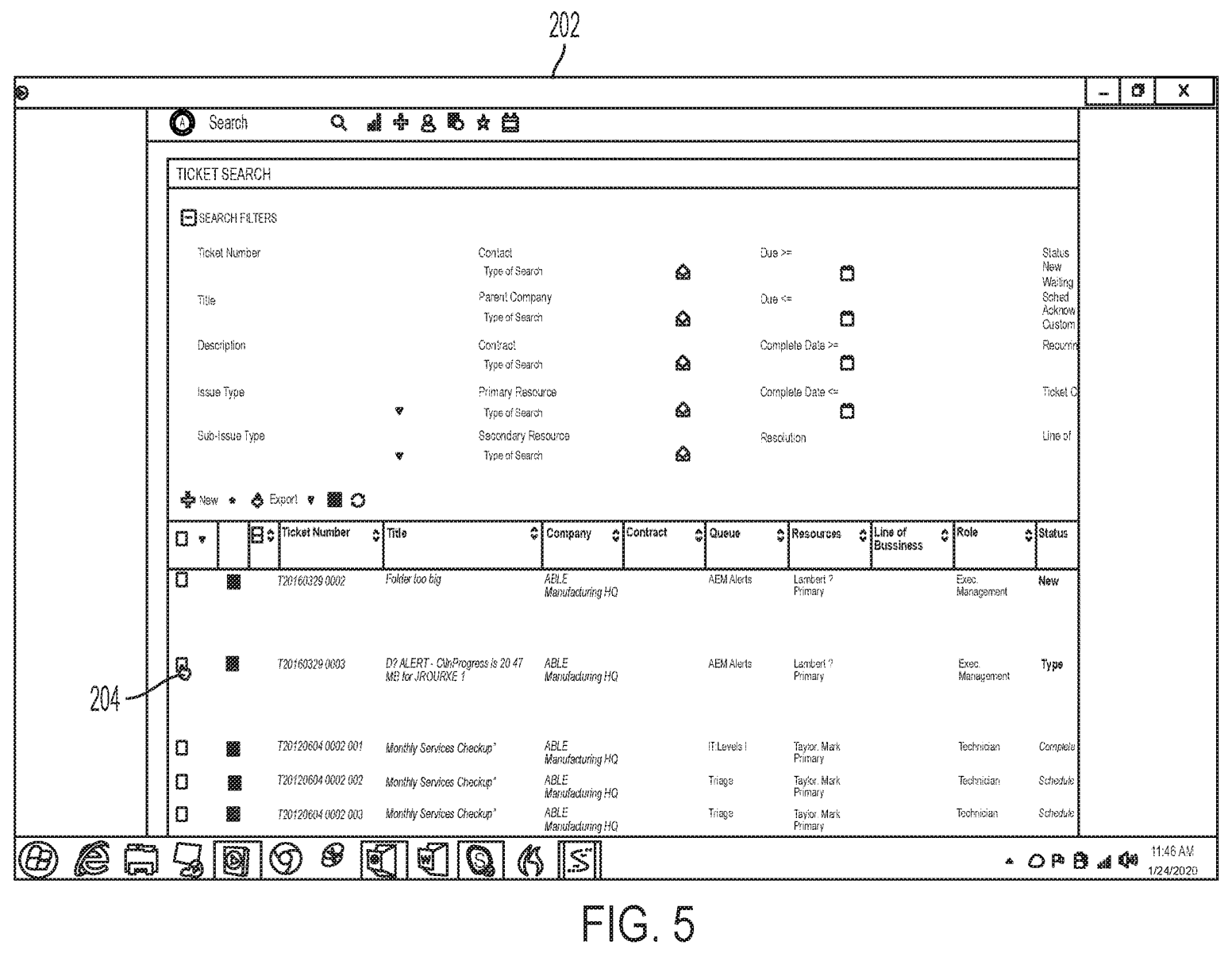

With reference to FIG. 5, shown is another user interface including a Ticket Search Window and associated cell grid populated with a plurality of ticket service entries associated with a web-browser-based PSA according to an exemplary embodiment of this disclosure. The user interface including a PSA (Professional Services Automation) Browser Window 202 and a user controlled Ticket Selection Icon 204 to select the row associated with Ticket Number T20160329.0003.

Figure 6:
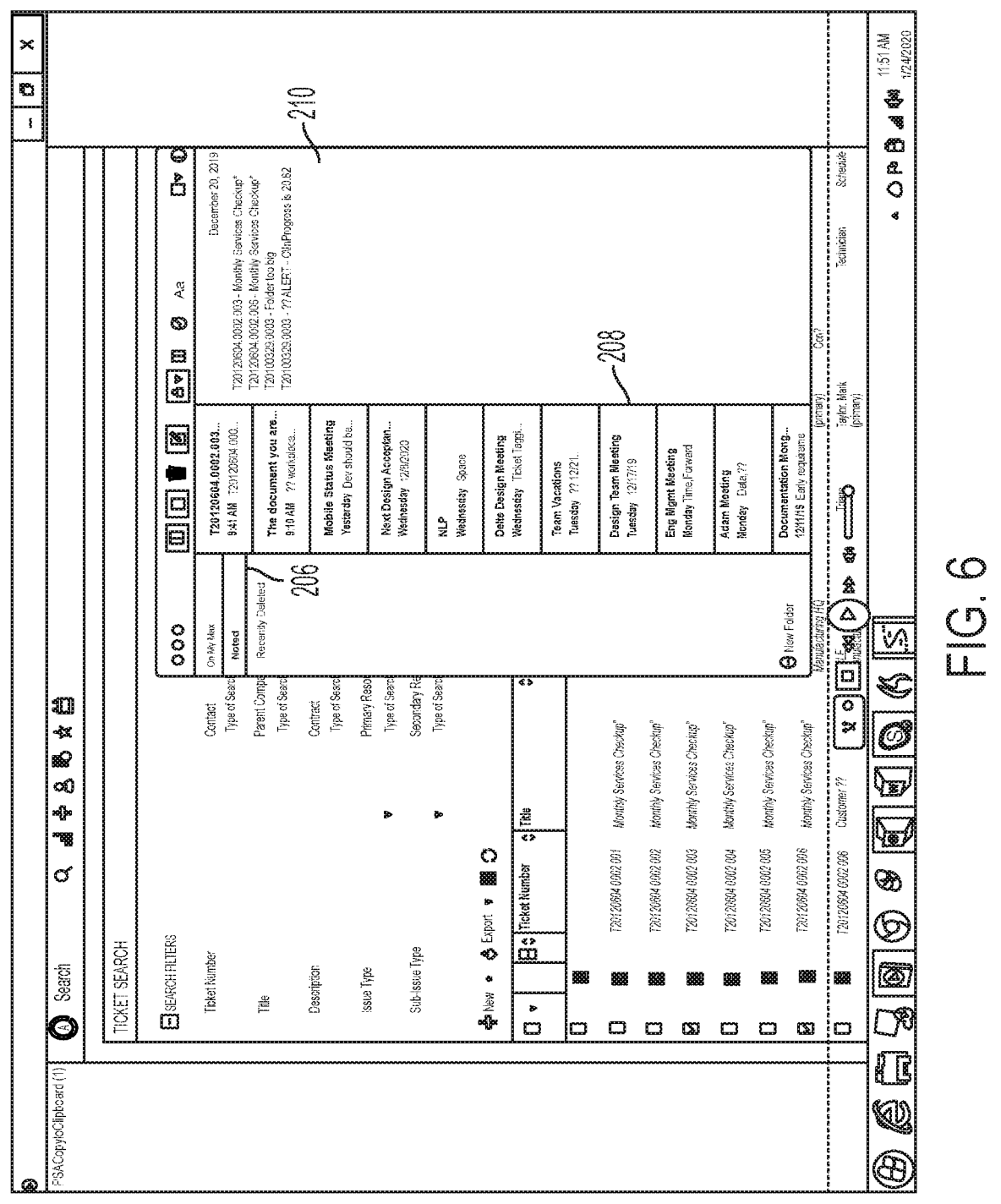

With reference to FIG. 6, provided is another illustration of the user interface shown in FIG. 5, including a drop-down user file directory window 206 including a plurality of user files 208, where the Notes File highlighted includes a user file including the results of the command to Copy Selected Ticket Numbers/Titles to a Clip Board 210 according to an exemplary embodiment of this disclosure.

Variations and other exemplary embodiments of Methods and Systems for bulk copying data from a cell grid to a workspace memory include, but are not limited, to the following:
  a) The user interface includes a plurality of Ticket Search Window Column Checkboxes for the user to indicate the column cells associated with all the selected rows for bulk copying to a clipboard, i.e. workspace;
  b) The user interface Drop-down Menu, e.g. 142, and associated configuration includes one or more of the following commands: Copy Selected Ticket Numbers/Titles to Archive; Copy Selected Ticket Numbers/Titles to Archive; Copy Selected Ticket Numbers/Titles to Archive; Copy Selected Ticket Numbers/Titles to Email; Copy Selected Ticket Numbers/Titles to Chat Message; Copy Selected Ticket Numbers/Titles to other Application; and Copy Selected Ticket Numbers/Titles to Document;
  c) The user interface Drop-down menu and associated configuration includes one or more of the following commands: Copy Selected Rows/Selected Columns to Build List Template 1; Copy Selected Rows/Selected Columns to Build List Template 2; Copy Selected Rows/Selected Columns to Build List Template 3, etc.; and
  d) The user interface Drop-down menu and associated configuration includes one or more of the following commands: Copy Selected Rows/Selected Columns to clipboard; Copy Selected Rows/Selected Columns to email; Copy Selected Rows/Selected Columns to chat message; Copy Selected Rows/Selected Columns to Archive; Copy Selected Rows/Selected Columns to other Program, etc.

Figure 7:
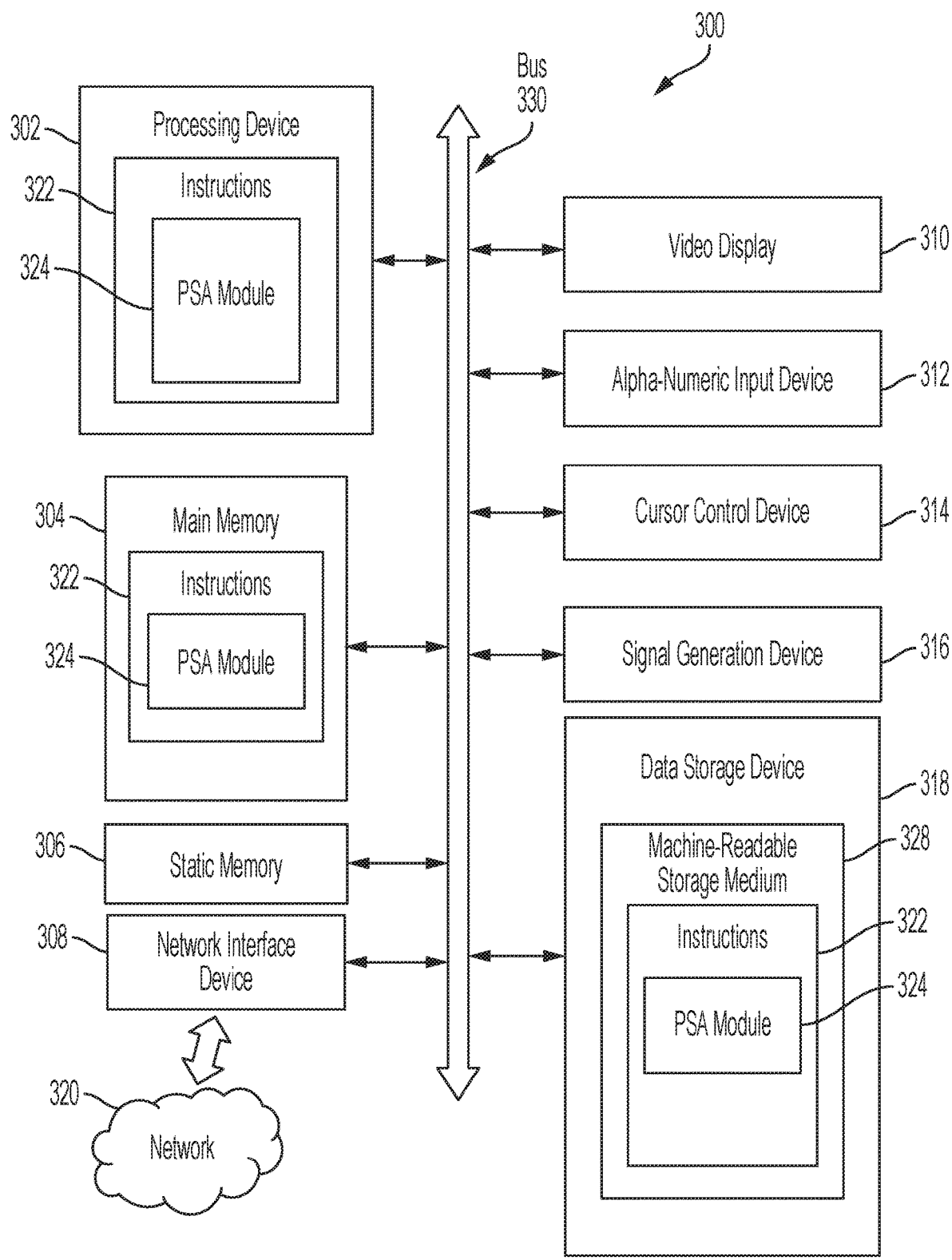
FIG. 7 is a block diagram of a computer system including a PSA (Professional Services Automation module) with a set of instructions to perform a method for bulk copying data from a cell grid to a clipboard according to an exemplary embodiment of this disclosure.

With reference to FIG. 7, illustrated is a block diagram of a computer system including a PSA (Professional Services Automation module) with a set of instructions to perform a method for bulk copying data from a cell grid to a clipboard according to an exemplary embodiment of this disclosure. According to various embodiments, the machine may be connected (e.g., networked 320) to other machines in a LAN, an intranet, an extranet, and/or the Internet. The machine may operate in the capacity of a server or a client machine in a client-server network environment, or as a peer machine in a peer-to-peer (or distributed) network environment.

The machine and devices described herein may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, a graphical processing unit (GPU), or the like. The processing device 302 is configured to execute instructions 322 for performing the operations and steps discussed herein.

The computing system 300 may further include a network interface device 308. The computing system 300 also may optionally include a video display unit 310 (e.g., a liquid crystal display (LCD), Light Emitting Diode (LED) monitor, or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-readable storage medium 328 (also known as a computer-readable medium) on which is stored one or more sets of instructions 322 or software embodying any one or more of the methodologies or functions described herein. The instructions 322 may also reside, completely or at least partially, within the main memory 304 and/or within the processing device 302 during execution thereof by the computer system 300, the main memory 304 and the processing device 302 also constituting machine-readable storage media.

In one implementation, the instructions 322 include instructions for a PSA (Processional Services Automation) module 324, and/or a software library containing methods that can be called by the PSA module 324. The instructions in the PSA module 324 and/or the software library may be used to implement the methods as described above in relation to FIGS. 1-6. While the machine-readable storage medium 328 is shown in an example implementation to be a single medium, the term "machine-readable storage medium" includes a single medium or multiple media (e.g., a centralized or distributed database, and/or associated caches and servers) that store the one or more sets of instructions. The term "machine-readable storage medium" also includes any medium that is capable of storing or encoding a set of instructions for execution by the machine and that cause the machine to perform any one or more of the methodologies of the present disclosure. The term "machine-readable storage medium" accordingly includes, but is not limited to, solid-state memories, optical media and magnetic media.

Disclosed herein are exemplary embodiments including, but not limited to the following:

[A1] A processor implemented method for bulk copying data from a cell grid to a workspace memory, the method comprising: a) displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings; b) a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and c) displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file, an API (Application Programming Interface) and a program file.

[A2] The processor implemented method for bulk copying data from a cell grid to a workspace memory according to paragraph [A1], wherein the predetermined subset of the associated column entries is selectable by the user, via the user interface, wherein each column includes a user selector column indicator.

[A3] The processor implemented method for bulk copying data from a cell grid to a workspace memory according to paragraph [A1], wherein the user selectable options include one or more of copy to clipboard, copy to archive, copy to chat message, and copy to document.

[A4] The processor implemented method for bulk copying data from a cell grid to a workspace memory according to paragraph [A1], wherein the method for bulk copying data from a cell grid to a workspace memory operates as a template bulk list builder.

[A5] The processor implemented method for bulk copying data from a cell grid to a workspace memory according to paragraph [A1], wherein the method is operatively associated with a web-based system and the user interface is accessible via a web browser.

[A6] The processor implemented method for bulk copying data from a cell grid to a workspace memory according to paragraph [A1], wherein the plurality of cell rows are associated with a plurality of service ticket entries, and each service ticket entry including a row of cells including a common column entry ordered row selector indicator cell and one or more other column entry cells including a service ticket number, a company associated with the service ticket number, company contact, contact title, contract name and queue associated with the service ticket number.

[A7] The processor implemented method for bulk copying data from a cell grid to a workspace memory according to paragraph [A1], wherein the cell grid is one of a data table, a spreadsheet, a data form, and a data template.

[A8] The processor implemented method for bulk copying data from a cell grid to a workspace memory according to paragraph [A1], wherein the user selectable options include a plurality of copy to the workspace memory command options, the options associated with a plurality of unique subsets of the associated column entries.

[A9] The processor implemented method for bulk copying data from a cell grid to a workspace memory according to paragraph [A1], wherein the workspace memory is associated with one of a static memory space and an active memory space.

[A10] The processor implemented method for bulk copying data from a cell grid to a workspace memory according to paragraph [A1], wherein step c) comprises: displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file and a program file, and the common predetermined subset of the associated column entries including a noncontinuous group of sequential columns where at least one column not included in the subset is located and displayed between two columns included in the predetermined subset.

[B1] An application user interface operatively associated with a computer device for bulk copying data from a cell grid to a workspace memory, the application user interface configured to perform a method comprising: a) displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings; b) a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows; and c) displaying in the user interface a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file, an API (Application Programming Interface) and a program file.

[B2] The application user interface operatively associated with a computer device for bulk copying data from a cell grid to a workspace memory according to paragraph [B1], wherein the user selectable options include one or more of copy to clipboard, copy to archive, copy to chat message, and copy to document.

[B3]. The application user interface operatively associated with a computer device for bulk copying data from a cell grid to a workspace memory according to paragraph [B1], wherein the user selectable options include one or more of copy to clipboard, copy to archive, copy to chat message, and copy to document.

[B4]. The application user interface operatively associated with a computer device for bulk copying data from a cell grid to a workspace memory according to paragraph [B1], wherein the method for bulk copying data from a cell grid to a workspace memory operates as a template bulk list builder.

[B5] The application user interface operatively associated with a computer device for bulk copying data from a cell grid to a workspace memory according to paragraph [B1], wherein the method is operatively associated with a web-based system and the user interface is accessible via a web browser.

[B6] The application user interface operatively associated with a computer device for bulk copying data from a cell grid to a workspace memory according to paragraph [B1], wherein the plurality of cell rows are associated with a plurality of service ticket entries, and each service ticket entry including a row of cells including a common column entry ordered row selector indicator cell and one or more other column entry cells including a service ticket number, a company associated with the service ticket number, company contact, contact title, contract name and queue associated with the service ticket number.

[B7] The application user interface operatively associated with a computer device for bulk copying data from a cell grid to a workspace memory according to paragraph [B1], wherein the cell grid is one of a data table, a spreadsheet, a data form, and a data template.

[B8] The application user interface operatively associated with a computer device for bulk copying data from a cell grid to a workspace memory according to paragraph [B1], wherein the user selectable options include a plurality of copy to the workspace memory command options, the options associated with a plurality of unique subsets of the associated column entries.

[B9] The application user interface operatively associated with a computer device for bulk copying data from a cell grid to a workspace memory according to paragraph [B1], wherein the workspace memory is associated with one of a static memory space and an active memory space.

[B10] The application user interface operatively associated with a computer device for bulk copying data from a cell grid to a workspace memory according to paragraph [B1], wherein step c) comprises: displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file and a program file, and the common predetermined subset of the associated column entries including a noncontinuous group of sequential columns where at least one column not included in the subset is located and displayed between two columns included in the predetermined subset.

[C1] A processor implemented method for bulk copying data from a cell grid to a clipboard, the method comprising: a) displaying, in a user interface, a plurality of service ticket entries in the cell grid, the cell grid including a plurality of cell rows and plurality of cell columns arranged in a grid form, the first row of cells including a plurality of cell column headings and each other row of cells associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number; b) a user, via the user interface, selecting a plurality of rows of service ticket entries by selecting a respective selector indicator of all rows of service ticket entries to be copied, the selected plurality of rows including a subset of a total number of rows displayed and a noncontinuous group of sequential rows where at least one nonselected row is located and displayed between two selected rows; and c) displaying, in the user interface, a drop-down menu including a plurality of user selectable options, the user selectable options including a user selectable command to copy the plurality of selected ticket numbers and a common predetermined subset of the associated column entries to a clipboard associated with a neutral storage space, the clipboard configured to enable the user to copy the plurality of selected ticket numbers and predetermined subset of the associated column entries into one or more of an application, an API (Application Programming Interface), a user file and a program file.

[C2] The processor implemented method for bulk copying data from a cell grid to a clipboard according to paragraph [C1], wherein the predetermined subset of the associated column entries is selectable by the user, via the user interface, wherein each column includes a user selector column indicator.

[C3] The processor implemented method for bulk copying data from a cell grid to a clipboard according to paragraph [C1], wherein the user selectable options include one or more of copy to clipboard, copy to archive, copy to chat message, and copy to document.

[C4] The processor implemented method for bulk copying data from a cell grid to a clipboard according to paragraph [C1], wherein the method for bulk copying data from a cell grid to a clipboard operates as a template bulk list builder.

[C5] The processor implemented method for bulk copying data from a cell grid to a clipboard according to paragraph [C1], wherein the method is operatively associated with a web-based system and the user interface is accessible via a web browser.

[C6] The processor implemented method for bulk copying data from a cell grid to a clipboard according to paragraph [C1], wherein the cell grid is one of a data table, a spreadsheet, a data form, and a data template.

[C7] The processor implemented method for bulk copying data from a cell grid to a clipboard according to paragraph

[C1], wherein the user selectable options include a plurality of copy to the clipboard command options, the options associated with a plurality of unique subsets of the associated column entries.

[C8] The processor implemented method for bulk copying data from a cell grid to a clipboard according to paragraph [C1], wherein the clipboard is associated with one of a static memory space and an active memory space.

[C9] The processor implemented method for bulk copying data from a cell grid to a clipboard according to paragraph [C1], wherein step c) comprises: displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file and a program file, and the common predetermined subset of the associated column entries including a noncontinuous group of sequential columns where at least one column not included in the subset is located and displayed between two columns included in the predetermined subset.

[D1] A PSA (Professional Services Automation module) operatively associated with a computer device for bulk copying data from a cell grid to a clipboard, the PSA configured to perform a method comprising: a) displaying, in a user interface, a plurality of service ticket entries in the cell grid, the cell grid including a plurality of cell rows and plurality of cell columns arranged in a grid form, the first row of cells including a plurality of cell column headings and each other row associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number; b) a user, via the user interface, selecting a plurality of rows of service ticket entries by selecting a respective selector indicator of all rows of service ticket entries to be copied, the selected plurality of rows including a subset of a total number of rows displayed and a noncontinuous group of rows where at least one nonselected row is located and displayed between two selected rows; and c) displaying, in the user interface, a drop-down menu including a plurality of user selectable options, the user selectable options including a user selectable command to copy the plurality of selected ticket numbers and a common predetermined subset of the associated column entries to a clipboard associated with a neutral storage space, the clipboard configured to enable the user to copy the plurality of selected ticket numbers and predetermined subset of the associated column entries into one or more of an application, an API (Application Programming Interface), a user file and a program file.

[D2] The PSA module operatively associated with a computer device for bulk copying data from a cell grid to a clipboard according to paragraph [D1], wherein the predetermined subset of the associated column entries is selectable by the user, via the user interface, wherein each column includes a user selector column indicator.

[D3] The PSA module operatively associated with a computer device for bulk copying data from a cell grid to a clipboard according to paragraph [D1], wherein the user selectable options include one or more of copy to clipboard, copy to archive, copy to chat message, and copy to document.

[D4] The PSA module operatively associated with a computer device for bulk copying data from a cell grid to a clipboard according to paragraph [D1], wherein the method for bulk copying data from a cell grid to a clipboard operates as a template bulk list builder.

[D5] The PSA module operatively associated with a computer device for bulk copying data from a cell grid to a clipboard according to paragraph [D1], wherein the method is operatively associated with a web-based system and the user interface is accessible via a web browser.

[D6] The PSA module operatively associated with a computer device for bulk copying data from a cell grid to a clipboard according to paragraph [D1], wherein the cell grid is one of a data table, a spreadsheet, a data form, and a data template.

[D7]. The PSA module operatively associated with a computer device for bulk copying data from a cell grid to a clipboard according to paragraph [D1], wherein the user selectable options include a plurality of copy to the clipboard command options, the options associated with a plurality of unique subsets of the associated column entries.

[D8] The PSA module operatively associated with a computer device for bulk copying data from a cell grid to a clipboard according to paragraph [D1], wherein the clipboard is associated with one of a static memory space and an active memory space.

[D9] The PSA module operatively associated with a computer device for bulk copying data from a cell grid to a clipboard according to paragraph [D1], wherein step c) comprises: displaying, in the user interface, a drop-down menu including a plurality of user selectable options, the user selectable options including a user selectable command to copy the plurality of selected rows and a common predetermined subset of the associated column entries to a workspace memory, the workspace memory configured to enable the user to copy the plurality of selected rows and predetermined subset of the associated column entries into one or more of an application, a user file and a program file, and the common predetermined subset of the associated column entries including a noncontinuous group of sequential columns where at least one column not included in the subset is located and displayed between two columns included in the predetermined subset.

[E1] A processor implemented method for bulk copying data from a cell grid to a workspace memory, the method comprising: a) displaying, in a user interface, a plurality of cell rows and a plurality of cell columns arranged in a grid form, the first row of cells including a plurality of cell column headings and each other row of cells including an ordered group of cells associated with the plurality of cell column headings, and each column of cells including a column selector indicator; b) a user, via the user interface, selecting a plurality of columns of cell entries by selecting a respective column selector indicator of all columns to be copied, the selected plurality of columns including a subset of a total number of columns displayed and a noncontinuous group of sequential columns where at least one nonselected column is located and displayed between two selected columns; and c) displaying, in the user interface, a drop-down menu including a plurality of user selectable options, the user selectable options including a user selectable command to copy the plurality of selected columns and a common predetermined subset of the associated row entries to a workspace memory, the workspace memory configured to enable the user to copy the plurality of selected columns and predetermined subset of the associated row entries into one or more of an application, a user file, an API (Application Programming Interface) and a program file.

[E2] The processor implemented method for bulk copying data from a cell grid to a workspace memory according to paragraph [E1], wherein the predetermined subset of the associated row entries is selectable by the user, via the user interface, wherein each row includes a user selector column indicator.

[E3] The processor implemented method for bulk copying data from a cell grid to a workspace memory according to paragraph [E1], wherein the user selectable options include one or more of copy to clipboard, copy to archive, copy to chat message, and copy to document.

[E4] The processor implemented method for bulk copying data from a cell grid to a workspace memory according to paragraph [E1], wherein the method for bulk copying data from a cell grid to a workspace memory operates as a template bulk list builder.

[E5] The processor implemented method for bulk copying data from a cell grid to a workspace memory according to paragraph [E1], wherein the method is operatively associated with a web-based system and the user interface is accessible via a web browser.

[E6] The processor implemented method for bulk copying data from a cell grid to a workspace memory according to paragraph [E1], wherein the plurality of cell rows are associated with a plurality of service ticket entries, and each service ticket entry including a row of cells including a common column entry ordered row selector indicator cell and one or more other column entry cells including a service ticket number, a company associated with the service ticket number, company contact, contact title, contract name and queue associated with the service ticket number.

[E7] The processor implemented method for bulk copying data from a cell grid to a workspace memory according to paragraph [E1], wherein the cell grid is one of a data table, a spreadsheet, a data form, and a data template.

[E8] The processor implemented method for bulk copying data from a cell grid to a workspace memory according to paragraph [E1], wherein the user selectable options include a plurality of copy to the workspace memory command options, the options associated with a plurality of unique subsets of the associated row entries.

[E9] The processor implemented method for bulk copying data from a cell grid to a workspace memory according to paragraph [E1], wherein the workspace memory is associated with one of a static memory space and an active memory space.

[E10] The processor implemented method for bulk copying data from a cell grid to a workspace memory according to paragraph [E1], wherein step c) comprises: displaying, in the user interface, a drop-down menu including a plurality of user selectable options, the user selectable options including a user selectable command to copy the plurality of selected columns and a subset of the associated row entries to a workspace memory, the workspace memory configured to enable the user to copy the plurality of selected columns and predetermined subset of the associated row entries into one or more of an application, a user file and a program file, and the predetermined subset of the associated row entries including a noncontinuous group of sequential rows where at least one row not included in the subset is located and displayed between two rows included in the predetermined subset.

[F1] An application user interface operatively associated with a computer device for bulk copying data from a cell grid to a workspace memory, the application user interface configured to perform a method comprising: a) displaying, in a user interface, a plurality of cell rows and a plurality of cell columns arranged in a grid form, the first row of cells including a plurality of cell column headings and each other row of cells including an ordered group of cells associated with the plurality of cell column headings, and each column of cells including a column selector indicator; b) a user, via the user interface, selecting a plurality of columns of cell entries by selecting a respective column selector indicator of all columns to be copied, the selected plurality of columns including a subset of a total number of columns displayed and a noncontinuous group of sequential columns where at least one nonselected column is located and displayed between two selected columns; and c) displaying, in the user interface, a drop-down menu including a plurality of user selectable options, the user selectable options including a user selectable command to copy the plurality of selected columns and a common predetermined subset of the associated row entries to a workspace memory, the workspace memory configured to enable the user to copy the plurality of selected columns and predetermined subset of the associated row entries into one or more of an application, a user file, an API (Application Programming Interface) and a program file.

[F2] The application user interface operatively associated with a computer device for bulk copying data from a cell grid to a workspace memory according to paragraph [F1], wherein the predetermined subset of the associated row entries is selectable by the user, via the user interface, wherein each row includes a user selector column indicator.

[F3] The application user interface operatively associated with a computer device for bulk copying data from a cell grid to a workspace memory according to paragraph [F1], wherein the user selectable options include one or more of copy to clipboard, copy to archive, copy to chat message, and copy to document.

[F4] The application user interface operatively associated with a computer device for bulk copying data from a cell grid to a workspace memory according to paragraph [F1], wherein the method for bulk copying data from a cell grid to a workspace memory operates as a template bulk list builder.

[F5] The application user interface operatively associated with a computer device for bulk copying data from a cell grid to a workspace memory according to paragraph [F1], wherein the method is operatively associated with a web-based system and the user interface is accessible via a web browser.

[F6] The application user interface operatively associated with a computer device for bulk copying data from a cell grid to a workspace memory according to paragraph [F1], wherein the plurality of cell rows are associated with a plurality of service ticket entries, and each service ticket entry including a row of cells including a common column entry ordered row selector indicator cell and one or more other column entry cells including a service ticket number, a company associated with the service ticket number, company contact, contact title, contract name and queue associated with the service ticket number.

[F7] The application user interface operatively associated with a computer device for bulk copying data from a cell grid to a workspace memory according to paragraph [F1], wherein the cell grid is one of a data table, a spreadsheet, a data form, and a data template.

[F8] The application user interface operatively associated with a computer device for bulk copying data from a cell grid to a workspace memory according to paragraph [F1], wherein the user selectable options include a plurality of copy to the workspace memory command options, the options associated with a plurality of unique subsets of the associated row entries.

[F9] The application user interface operatively associated with a computer device for bulk copying data from a cell grid to a workspace memory according to paragraph [F1], wherein the workspace memory is associated with one of a static memory space and an active memory space.

[F10] The application user interface operatively associated with a computer device for bulk copying data from a cell grid to a workspace memory according to paragraph [F1], wherein step c) comprises: displaying, in the user interface, a drop-down menu including a plurality of user selectable options, the user selectable options including a user selectable command to copy the plurality of selected columns and a subset of the associated row entries to a workspace memory, the workspace memory configured to enable the user to copy the plurality of selected columns and predetermined subset of the associated row entries into one or more of an application, a user file and a program file, and the predetermined subset of the associated row entries including a noncontinuous group of sequential rows where at least one row not included in the subset is located and displayed between two rows included in the predetermined subset.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. An application user interface operatively associated with a computer device for bulk copying data from a cell grid to a workspace memory, the application user interface configured to perform a processor implemented method comprising:

displaying, in a user interface, a plurality of cell rows and a plurality of cell columns arranged in a grid form, the first row of cells including a plurality of cell column headings and each other row of cells including a common column row selector indicator cell and one or more other cells associated with one or more of the plurality of column headings, and a number of the plurality of cell columns each including a respective column selector indicator cell associated therewith;

a user, via the user interface, selecting a plurality of rows of cell entries by selecting a respective selector indicator of all rows to be copied, the selected plurality of rows including a subset of a total number of rows displayed and a noncontinuous group of sequential rows where at least one nonselected row is located and displayed between two selected rows and selecting a plurality of columns by selecting a respective column selector indicator of all columns to be copied, the selected plurality of columns including a subset of a total number of columns displayed and a noncontinuous group of sequential columns where at least one nonselected column is located and displayed between two selected columns; and displaying in the user interface a drop-down menu including a plurality of user selectable options, the user selectable options including a user selectable command to copy the plurality of selected rows and the associated plurality of selected column entries to a workspace memory, the workspace memory configured to enable the user to copy the plurality of selected rows and the associated plurality of selected column entries into one or more of an application, a user file, an API (Application Programming Interface) and a program file.

2. The application user interface operatively associated with a computer device for bulk copying data from a cell grid to a workspace memory according to claim 1, wherein the user selectable options include one or more of copy to clipboard, copy to archive, copy to chat message, and copy to document.

3. The application user interface operatively associated with a computer device for bulk copying data from a cell grid to a workspace memory according to claim 1, wherein the method is operatively associated with a web-based system and the user interface is accessible via a web browser.

4. The application user interface operatively associated with a computer device for bulk copying data from a cell grid to a workspace memory according to claim 1, wherein the plurality of cell rows are associated with a plurality of service ticket entries, and each service ticket entry including a row of cells including a common column entry ordered row selector indicator cell and one or more other column entry cells including a service ticket number, a company associated with the service ticket number, company contact, contact title, contract name and queue associated with the service ticket number.

5. The application user interface operatively associated with a computer device for bulk copying data from a cell grid to a workspace memory according to claim 1, wherein the cell grid is one of a data table, a spreadsheet, a data form, and a data template.

6. The application user interface operatively associated with a computer device for bulk copying data from a cell grid to a workspace memory according to claim 1, wherein the user selectable options include a plurality of copy to the workspace memory command options, the options associated with a plurality of unique subsets of the associated column entries.

7. A processor implemented method for bulk copying data from a cell grid to a clipboard, the method comprising:

a) displaying, in a user interface, a plurality of service ticket entries in the cell grid, the cell grid including a plurality of cell rows and plurality of cell columns arranged in a grid form, the first row of cells including a plurality of cell column headings and each other row of cells associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number, a number of the plurality of cell columns each including a respective column selector indicator cell associated therewith;

b) a user, via the user interface, selecting a plurality of rows of service ticket entries by selecting a respective selector indicator of all rows of service ticket entries to be copied, the selected plurality of rows including a subset of a total number of rows displayed and a noncontinuous group of sequential rows where at least one nonselected row is located and displayed between two selected rows and selecting a plurality of columns by selecting a respective column selector indicator of all columns to be copied, the selected plurality of columns including a subset of a total number of columns displayed and a noncontinuous group of sequential columns where at least one nonselected column is located and displayed between two selected columns; and c) displaying, in the user interface, a drop-down menu including a plurality of user selectable options, the user selectable options including a user selectable command to copy the plurality of selected ticket numbers and of the associated plurality of selected column entries to a clipboard associated with a neutral storage space, the clipboard configured to enable the user to copy the plurality of selected ticket numbers and the associated plurality of selected column entries into one or more of an application, an API (Application Programming Interface), a user file and a program file.

8. The processor implemented method for bulk copying data from a cell grid to a clipboard according to claim 7, wherein the user selectable options include one or more of copy to clipboard, copy to archive, copy to chat message, and copy to document.

9. The processor implemented method for bulk copying data from a cell grid to a clipboard according to claim 7, wherein the method is operatively associated with a web-based system and the user interface is accessible via a web browser.

10. The processor implemented method for bulk copying data from a cell grid to a clipboard according to claim 7, wherein the cell grid is one of a data table, a spreadsheet, a data form, and a data template.

11. The processor implemented method for bulk copying data from a cell grid to a clipboard according to claim 7, wherein the user selectable options include a plurality of copy to the clipboard command options, the options associated with a plurality of unique subsets of the associated column entries.

12. A PSA (Professional Services Automation module) operatively associated with a computer device for bulk copying data from a cell grid to a clipboard, the PSA configured to perform a processor implemented method comprising:
  a) displaying, in a user interface, a plurality of service ticket entries in the cell grid, the cell grid including a plurality of cell rows and plurality of cell columns arranged in a grid form, the first row of cells including a plurality of cell column headings and each other row associated with a service ticket entry including a row of cells including a common column row selector indicator cell and one or more other cells associated with one or more of the plurality of column headings including a service ticket number, a company associated with the service ticket number, company contact, contact title, contract name and queue associated with the service ticket number, and a number of the plurality of cell columns each including a respective column selector indicator cell associated therewith;
  b) a user, via the user interface, selecting a plurality of rows of service ticket entries by selecting a respective selector indicator of all rows of service ticket entries to be copied, the selected plurality of rows including a subset of a total number of rows displayed and a noncontinuous group of rows where at least one nonselected row is located and displayed between two selected rows and selecting a plurality of columns by selecting a respective column selector indicator of all columns to be copied, the selected plurality of columns including a subset of a total number of columns displayed and a noncontinuous group of sequential columns where at least one nonselected column is located and displayed between two selected columns; and
  c) displaying, in the user interface, a drop-down menu including a plurality of user selectable options, the user selectable options including a user selectable command to copy the plurality of selected ticket numbers and of the associated plurality of selected column entries to a clipboard associated with a neutral storage space, the clipboard configured to enable the user to copy the plurality of selected ticket numbers and the associated plurality of selected column entries into one or more of an application, an API (Application Programming Interface), a user file and a program file.

13. The PSA module operatively associated with a computer device for bulk copying data from a cell grid to a clipboard according to claim 12, wherein the user selectable options include one or more of copy to clipboard, copy to archive, copy to chat message, and copy to document.

14. The PSA module operatively associated with a computer device for bulk copying data from a cell grid to a clipboard according to claim 12, wherein the method is operatively associated with a web-based system and the user interface is accessible via a web browser.

15. The PSA module operatively associated with a computer device for bulk copying data from a cell grid to a clipboard according to claim 12, wherein the cell grid is one of a data table, a spreadsheet, a data form, and a data template.

16. The PSA module operatively associated with a computer device for bulk copying data from a cell grid to a clipboard according to claim 12, wherein the user selectable options include a plurality of copy to the clipboard command options, the options associated with a plurality of unique subsets of the associated column entries.

* * * * *